United States Patent
Señoret Verdugo (10) Patent No.: US 10,745,647 B2
(45) Date of Patent: Aug. 18, 2020

(54) DEVICE FOR EXTRACTING VOLATILE OILS CONTAINED IN ORGANIC RAW MATERIAL VIA STEAM STRIPPING AND INTERNAL DISTILLATION METHOD

(71) Applicant: Ramiro Señoret Verdugo, Santiago (CL)

(72) Inventor: Ramiro Señoret Verdugo, Santiago (CL)

( * ) Notice: Subject to any disclaimer, the term of this patent is extended or adjusted under 35 U.S.C. 154(b) by 0 days.

(21) Appl. No.: 16/348,367

(22) PCT Filed: Oct. 23, 2017

(86) PCT No.: PCT/CL2017/000032
§ 371 (c)(1),
(2) Date: May 8, 2019

(87) PCT Pub. No.: WO2018/085953
PCT Pub. Date: May 17, 2018

(65) Prior Publication Data
US 2019/0255458 A1    Aug. 22, 2019

(30) Foreign Application Priority Data
Nov. 10, 2016  (CL) .................................. 2865-2016

(51) Int. Cl.
*C11B 9/02*     (2006.01)
*B01D 5/00*     (2006.01)
(Continued)

(52) U.S. Cl.
CPC ................ *C11B 9/027* (2013.01); *B01D 3/00* (2013.01); *B01D 3/02* (2013.01); *B01D 3/38* (2013.01);
(Continued)

(58) Field of Classification Search
CPC ... B01D 3/00; B01D 3/02; B01D 3/38; B01D 2011/007; C11B 9/027
See application file for complete search history.

(56) References Cited

U.S. PATENT DOCUMENTS 460,398 A  *  9/1891  McGarvey ........... B01D 5/0066
                                                    202/190
4,089,750 A    5/1978  Kirschman et al.
(Continued)

FOREIGN PATENT DOCUMENTS

| GB | 13598 | * | 6/1906 | |
|---|---|---|---|---|
| WO | 2013142827 A1 | | 9/2013 | |
| WO | WO2014116143 A1 | * | 7/2014 | ............. C11B 9/027 |

OTHER PUBLICATIONS

WO2014116143A1_ENG (Espacenet machine translation of Novikov) (Year: 2014).*
(Continued)

*Primary Examiner* — Jonathan Miller
*Assistant Examiner* — Gabriel E Gitman
(74) *Attorney, Agent, or Firm* — The Marbury Law Group, PLLC (57) ABSTRACT

The present patent application relates to a compact device with a modular design, and to a method for extracting volatile oils and herbal distillates contained in organic matter, using the extraction technique of steam distillation. The device is formed by a lower cylindrical module on top of which an upper hemispherical module may be disposed, and both modules may be secured to form a single hermetic body. The lower module may contain a hot-water boiler, a heat conducting disc, a steam-heating chamber, a still of raw material, and a valve for regulating the steam flow. The upper module may contain a conical steam condenser, a hemispherical cover, a ring for collecting distilled liquid, and a tube for removing the distilled liquid. The distillation (Continued)

method of internal steam distillation may integrate, in a single physical body, a semi-closed steam flow circuit that may include all the functions of distillation.

20 Claims, 5 Drawing Sheets

(51) Int. Cl.
    *B01D 3/02*         (2006.01)
    *B01D 3/38*         (2006.01)
    *B01D 3/00*         (2006.01)
    *B01D 11/00*       (2006.01)

(52) U.S. Cl.
    CPC .... *B01D 2011/007* (2013.01); *B01D 2202/00* (2013.01)

(56) References Cited

U.S. PATENT DOCUMENTS

| | | |
|---|---|---|
| 4,882,012 A | 11/1989 | Wasserman |
| 5,565,065 A | 10/1996 | Wang |
| 2013/0068608 A1 | 3/2013 | Ba-abbad et al. |

OTHER PUBLICATIONS

International Search Report and Written Opinion for International Application No. PCT/CL2017/000032 dated Jan. 24, 2018, 10 pages.

\* cited by examiner

DEVICE FOR EXTRACTING VOLATILE OILS CONTAINED IN ORGANIC RAW MATERIAL VIA STEAM STRIPPING AND INTERNAL DISTILLATION METHOD

RELATED APPLICATIONS

This application is a continuation of International Application No. PCT/CL2017/000032, filed on Oct. 23, 2017, the entire contents of which are incorporated herein by reference.

BACKGROUND

The extraction of essential oils from aromatic plants through the method known as "steam distillation" has been performed by humanity since ancient times and is a common practice in biochemical labs and industries such as: pharmaceutical, gastronomical, petrochemical, aromatherapy and perfume elaboration, etc. all around the world today.

The old alembics like modern oil distillers are characterized for having different containers which are successively connected directly and/or through pipelines. In each one of these containers the necessary processes for distillation successively takes place, for example, as in an Arabic alembic and using the Clevenger method.

SUMMARY

Various embodiments are disclosed for devices and methods for internal steam distillation. Some embodiments may include a modular steam distillation device for the extraction of volatile substances contained in raw materials of organic or inorganic nature, the upper module of said device may dispose a double-walled condenser cover (B1) that may allow the circulation of cold water inside of it, the lower module of said device may be installed over a stove and may include three concentric cylindrical vessels arranged successively one inside the other, in such a way that the space between the external vessel and the intermediate vessel may form the boiler (A1), in the center of the bottom of said boiler (A1) there may be a solid heat conducting disc (A2) that may conduct heat from said kitchen to the base of said intermediate vessel across the boiler (A1), the space between the intermediate vessel and the internal vessel may form a chamber (A3) of steam heating, and the space of the internal vessel may form a still (A4) for installation of solid raw material to distill, the device may have an open valve (A5) with internal profile in the form of a Venturi tube for dosing and direction of the steam flow from said chamber (A3) towards the inside of said still (A4), said valve (A5) may be located crossing the center of the bottom of the still (A4), between the lower edge of the lid (B1) and the upper edge of the still (A4) a flat elastic ring (B2) for hermetical closure of both modules of the distiller may be disposed, said ring (B2) also serves for the internal collection of the liquid distillate that may be evacuated from the device by means of an evacuation tube (B3) located at the lower edge of the lid (B1).

In some embodiments, along the entire upper internal edge of the boiler (A1) it may have a slot that allows the passage of steam from the boiler (A1) to the steam chamber (A3).

In some embodiments, the valve (A5) may be formed by three solid trunks conically emptied at one of their ends and screwed one on top of the other.

In some embodiments, an elastic gasket (A6) may be provided for hermetical closure of the boiler (A1), said gasket may be located on the upper edge of the boiler (A1) and has a flat ring shape.

In some embodiments, on the underside of the lid (B1) there may be a conical surface that allows the internal condensation of mixed gases.

In some embodiments, the lid (B1), at its apex, may have a threaded terminal fitting that allows the installation of a thermometer and may be used to put together an additional condenser for fractional distillation.

In some embodiments, the force required for a hermetical closure of the boiler (A1), the still (A4) and the lid (B1) may be exerted by three bolt-type fasteners which are located equidistantly one of the other on the sides of the device.

In some embodiments, on the outer side of the boiler (A1) the may be the threaded terminal fittings (C1) configured for the installation of: hoses for feeding and evacuating water from the boiler (A1) located on the lower and upper side of said boiler (A1), water level meter (C2) of said boiler (A1), transparent glass tube to measure the level of water from said boiler (A1), water thermometer (C3) from said boiler (A1) and safety valve for eventual excess steam pressure (C4).

In some embodiments, on the outside of the lid (B1) it may have the threaded terminal fittings configured for the installation of cold water inlet and outlet hoses (D1) and mixed gas thermometer (D2).

Some embodiments may include a method of internal steam distillation for extraction of volatile oils present in organic matter carried out by means of said device or similar, which may be implemented within the single body of said device. In some embodiments, the method may include steps to generate dry steam in the boiler (A1), produce a vacuum effect in the boiler, provide boiling water at low temperature approximately between 60 and 85° C., conduct heat from a stove to the steam heating chamber (A3) by means of a heat conducting disc (A2) located inside the device, internally reheat the steam in said chamber (A3) to approximately between 110-115° C., inject, dose and diffuse the pressured steam flow entering the still (A4) through the valve (A5) of the device, preheat and temper the still (A4) and also the raw material contained in it, volatilize the aromatic oils contained in the raw material and "drag", or strip away, the mixed gases, or oil gases, from the still (A4) to the lid (B1), cool the internal space of the lid (B1) by means of cold water, condensate the mixed gases in contact with the cone of the lid (B1), drain the distilled liquids from the lid (B1) to the collector ring (B2), collect the distilled liquid and drive it to the evacuation tube (B3), evacuate the distilled liquid from the device through the evacuation tube (B3).

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

I.—Overview

Figure 1:
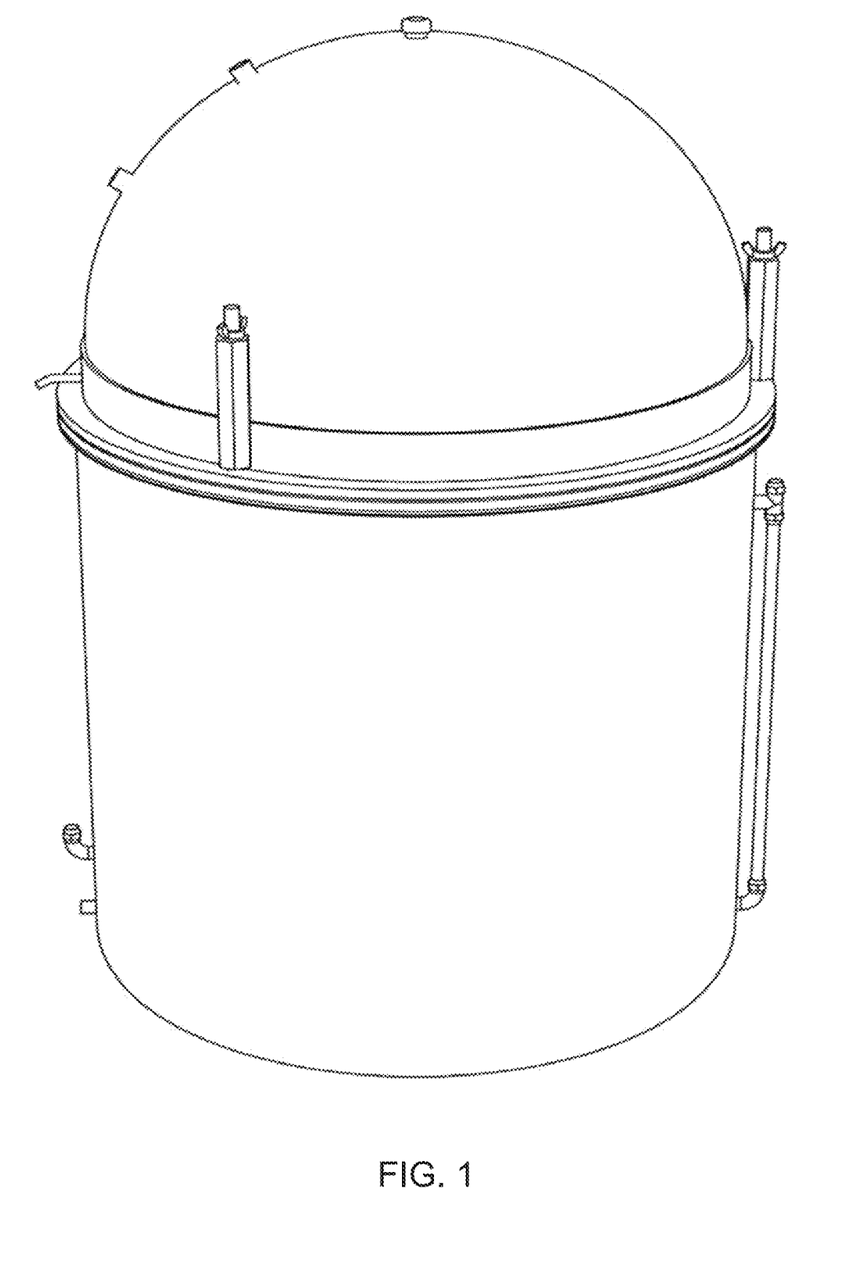
FIG. 1 is a elevation view diagram of a device according to some embodiments.

FIG. 1 illustrates an external view of the device.

Figure 2:
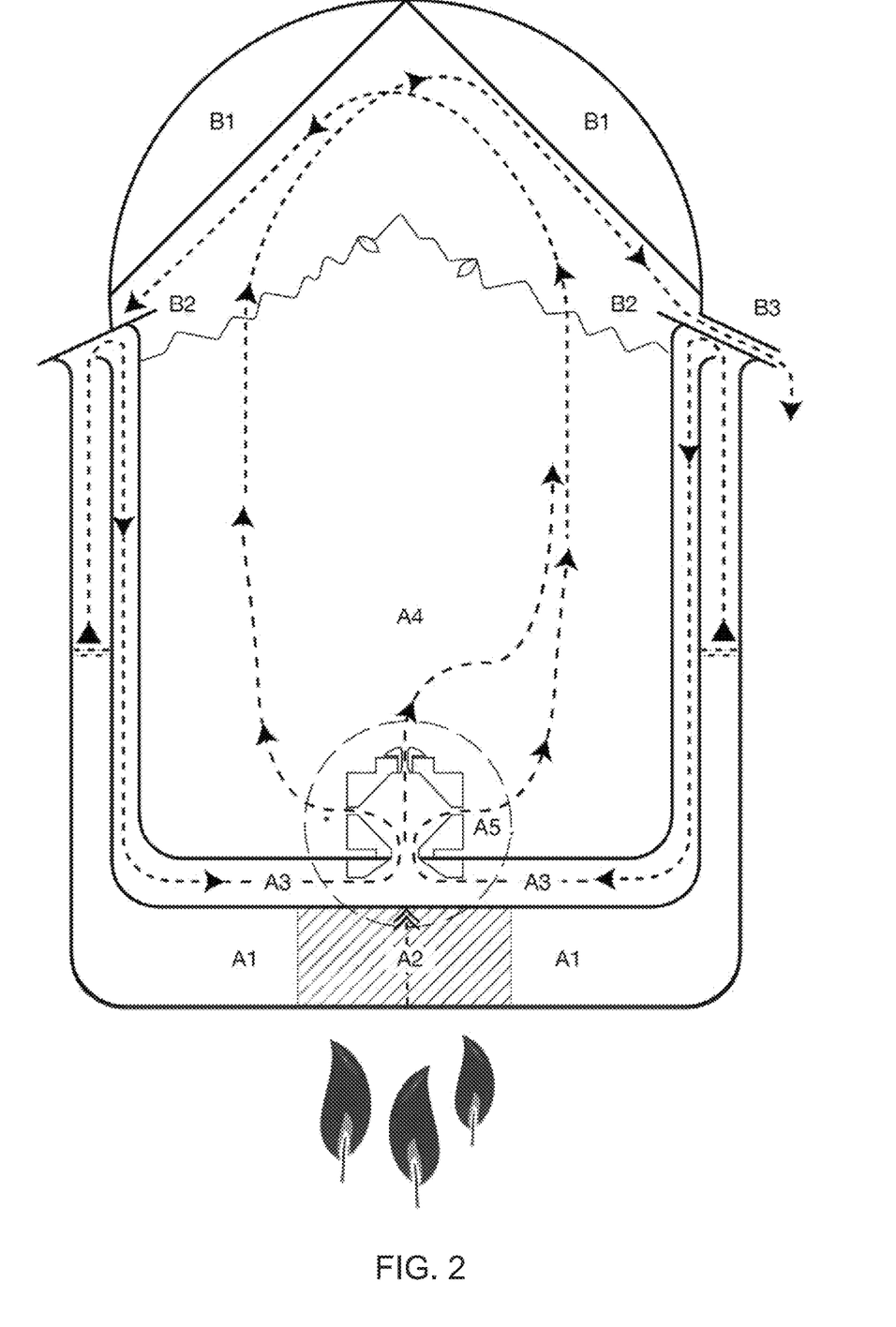
FIG. 2 is a cross-section view and flow diagram of a device according to some embodiments.

FIG. 2 illustrates a cross section and flow view of the steam flow route. The steam route is shown in dotted lines and arrow heads, which may start just over the evaporation surface at the upper level of the water in the boiler (A1), the steam may ascend along the inner side of the boiler (A1) and then descend to the bottom of the heating chamber (A3), flow through the valve (A5), and the steam moves up through the still (A4) where the prime matter may be found. Having emerged through the upper surface of the prime matter, the mixed gases (steam-oil) may contact the cold side of the condensation lid (B1) where they may condense, the mixed condensed liquid may drain by adsorption and gravity down to the collection ring (B2), and the distilled liquid may be conducted by the collection ring (B2) to the tube (B3) and evacuated to the outside of the device. The upper level of the prime matter is indicated with a jagged line and leaves. The steam access valve (A5) is illustrated encircled by a dotted line.

Figure 3:
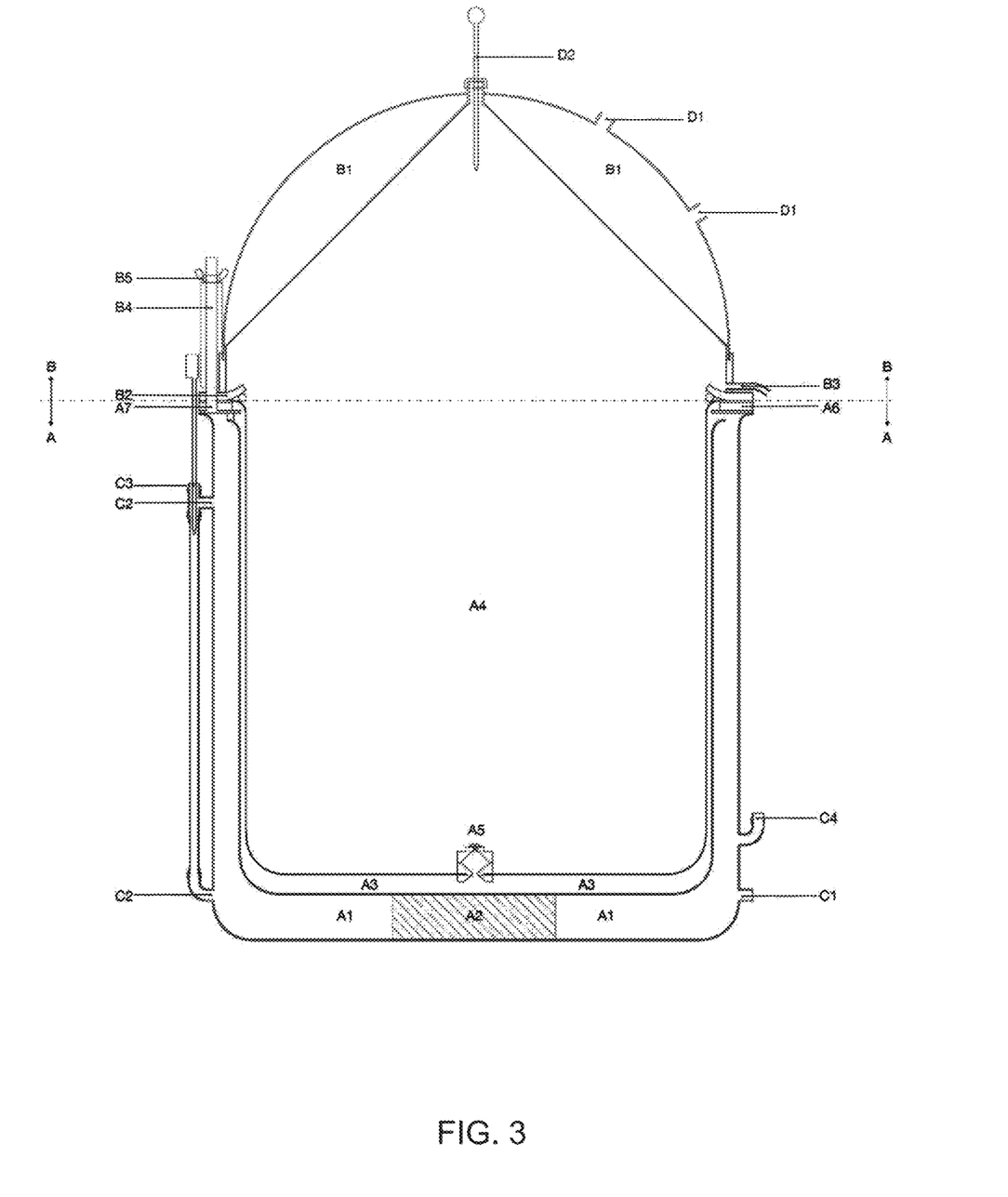
FIG. 3 is a cross-section view diagram of a device according to some embodiments.
Figure 4:
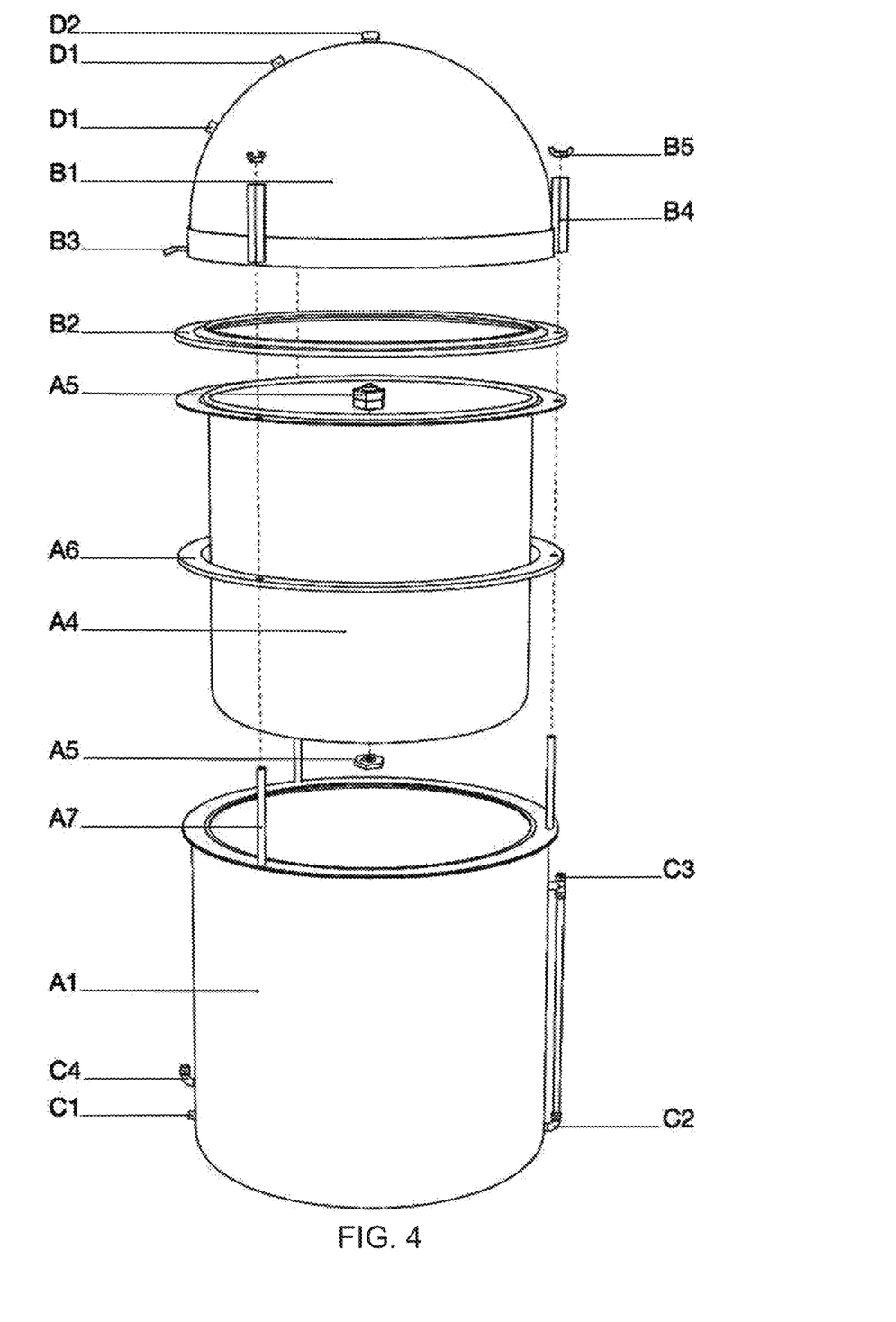
FIG. 4 is an exploded view diagram of a device according to some embodiments.

FIGS. 3 and 4 illustrate a cross section view of the device that shows elements including:

A1.—Double side and bottom boiler for water heating and boiling.
A2.—Solid metal disc for heat conduction from the stove to the steam chamber (A3).
A3.—Steam heating chamber.
A4.—Still where the prime matter to be distilled is deposited.
A5.—Steam access valve.
A6.—Ring gasket of the boiler (A1).
A7.—Fastening bolt of the boiler (A1).
B1.—Double sided condensation lid.
B2.—Distilled liquid collection ring.
B3.—Distilled liquid evacuation spout.
B4.—Condensation lid (B1) closure bindings.
B5.—Condensation lid (B1) fastening bolts.
C1.—Water input and output fitting of the boiler (A1).
C2.—Water level tube insertion fittings of the boiler (A1).
C3.—Thermometer insertion fitting of the boiler (A1).
D1.—Condensation lid (B1) cold water input and output fittings.
D2.—Mixed gases thermometer insertion fitting.

Figure 5:
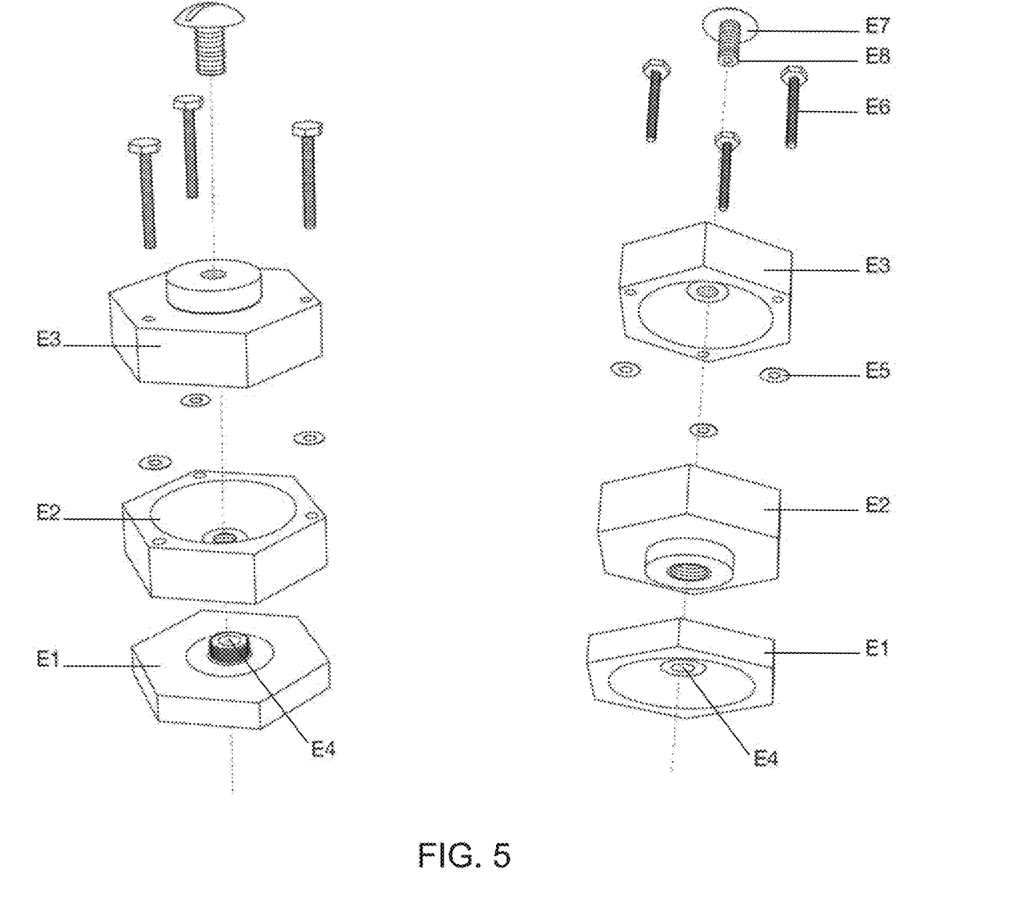
FIG. 5 is an exploded view diagram of a valve according to some embodiments.
Figure 6:
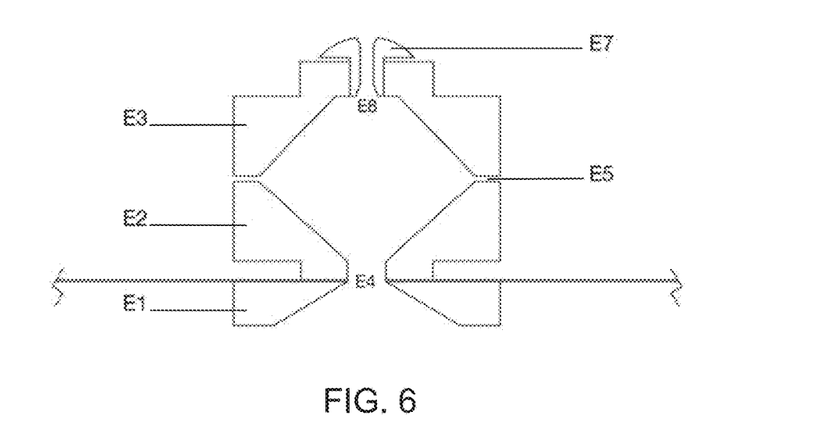
FIG. 6 is a cross-section view diagram of a valve according to some embodiments.

FIGS. 5 and 6. Illustrate over head and from below views of the valve (A5) and vertical cross section drawings of the valve (A5), and include:

E1.—Lower body of the valve (A5).
E2.—Middle body of the valve (A5).
E3.—Upper body of the valve (A5).
E4.—Internal profile of a Venturi type tube between bodies (E1) and (E2) of the valve (A5).
E5.—Separation washers between bodies (E2) and (E3).
E6.—Fastening bolts for bodies (E2) and (E3).
E7.—Hollowed bolt for vertical steam injection to the still (A4).
E8.—Venturi type tube profile of the bolt (E7).
A.—Lower module (A) of the device. See FIGS. 1-6.

The steam distillation procedure begins with steam production through boiling water and there exist mainly two traditional methods:

The old method, in which water is heated with fire in a container, then the steam freely ascends and goes through the prime matter which is located over a rack in the middle part of the same container.

The modern method, which consists of pressurized steam production in a special independent apparatus and then the steam is conducted by pipe line to the lower end of the prime matter still and injected to it.

The terms "prime matter" and "raw material" are used interchangeably herein.

The difference in design of the device presented in this application compared to traditional methods is that the inside of the apparatus may include a steam heating chamber (A3) situated between the steam heating boiler (A1) and the prime matter still (A4). The device may include a solid metal heat conducting disc (A2) located inside the boiler, said disc (A2) may conduct heat up to the steam heating chamber (A3) via the boiler (A1). Said device may also include an open valve (A5) that may provide access for steam to enter into the still (A4). The inclusion of these elements allows for an in situ production of pressurized dry steam, where traditional devices are not configured with this internal ability. There may be a vacuum effect generated by the Venturi type valve (A5) that is part of the device that may generate a natural vortex motion of the steam in the heating chamber (A3), reducing and/or minimizing steam turbulence. Re-heating the steam may reduce the water boiling point significantly lower than 100° C. (for example, between 60 and 80° C.), resulting in reduction in time and energy to complete the extraction process.

The design and elements that compose the lower module (A) of the device may have the following advantages over the design and elements of traditional equipment:

1. Avoid loss of energy as well as steam pressure and temperature because of the absence of pipe line connections between the boiler (A1), the steam heating chamber (A3), and the still (A4) where the prime matter resides.
2. The heat conducting disc (A2) re-heating the steam produced in the boiler (A1) increases its pressure and reduces the necessary temperature for boiling water in the boiler (A1), which results in reduced energy use and heating time.
3. The heat conducting disc (A2) generates an in situ source of dry steam with enough pressure to ascend through the prime matter drawing away the volatile oils contained in it. There is no need for an external steam production unit, as is the case in modern distillers.
4. The small and/or minimal water evaporation surface of the boiler (A1) achieved with this design allows dry steam production, which means: less sensible heat and more latent heat, ideal for distillation.
5. The inclusion of a steam heating chamber (A3) between the boiler (A1) and the still (A4) allows preheating the prime matter environment before the beginning of distillation, speeding-up the start-up of the distillation as well.
6. The inclusion of a steam heating chamber (A3) increases and/or maximizes the contact area between the water in the still (A4) and the vapor in the chamber (A3) during distillation, and as such balances water-steam temperature in the device.
7. Change of the inner diameter of the valve (A5) modifies the steam flow volume, temperature, and pressure let into the still (A4), and as such the device is adjustable to specific time and temperature requirements of the prime matter to be distilled.

The traditional distillation procedure continues with the mixed gases evacuation from the still through an external appendix that precedes a condensation tube. That is to say the mixed gases that emanate from the upper part of the still are conducted through a wide conical tube located over or at the upper side of the still and are carried to the refrigeration tube that is generally placed by the side of said still.

B.—Upper module (B) of the device. See FIGS. 1-4.

In the device presented here the mixed gases condensation may happen inside the distiller at the condensation lid (B1). The condensation lid (B1) may be installed over the boiler (A1) and may also be configured as the cover of the still (A4). The mixed gases may make contact with the conic inner area of the lid (B1) and condense, and distilled liquid may drip along internally by gravity and adsorption to the base of the lid (B1), where it may be retained by the collector ring (B2). Said ring (B2) may conduct the distilled liquid to the evacuation tube (B3) by which the distilled liquid may exit the device. This collector ring (B2) may also be configured as a hermetic gasket between the base (A) and cover (B) of the device.

The design and elements that make up the upper module (B) of the distiller present the following advantages compared to the design and elements of traditional distillers:
1. Evacuation of mixed gases from the distiller is not required because condensation happens inside of it, in this way saturation and premature condensation of mixed gases located in the upper part of the still (A4) is avoided, as well as premature precipitation of distilled liquid over the prime matter, which is a common problem with traditional equipment.
2. The design of the device reduces and/or minimizes the route length of mixed gases from the still (A4) to the condensation area, speeding up and economizing the distillation process.
3. The design of the device allows increases and/or maximizes both the spaciousness of access for the mixed gases to the condensation area, and also increases and/or maximizes the contact area between the mixed gases in suspension and the cold lid (B1), speeding up the condensation process.
4. The internal projection of at least part of the width of the liquid collector ring (B2) may allow for immediate and complete collection of the distilled liquid inside the device, so it avoids distillate leaking back to the prime matter, which is a common problem with traditional distillation equipment.
5. There is no need for an external condensation tube unit, indispensable in traditional distillation kits.

General advantages of the internal distillation apparatus:
1. It incorporates all the necessary functions for a complete and efficient distillation in one compact, tough and easily transportable body.
2. The use of only two independent modules that comprise all the parts of the device enables a quick and simple assembly of it, saving installation and starting time.
3. The size of the device can be varied, if a certain degree of proportion in make-up of the elements is kept. The distiller size can increase from a couple of liters or less up to 150 liters of prime matter or more, the relative efficiency of extraction will increase with size, offering diverse possible sizes for different purposes.
4. A great variety of materials can be used for building parts, for example: steel, copper, aluminum and glass. It could similarly be manufactured using ceramics, medium heat (e.g., 130° C.) plastics, carbon fiber, etc. There is a great versatility of the design for adapting to different conditions of: local availability of manufacturing materials, nature of prime matter to be distilled, special operating or maintenance conditions of the distillers, etc.
5. It can be constructed using pots or vessels commonly found in stores, making easier economical manufacturing of the parts.
6. It can be adapted for vacuum assisted distillation, factoring in necessary safety precautions regarding resistance of manufacturing materials.
7. It can be used for fractional distillation by adding a second condensation lid over the first one.
8. Solvents different than water, for example, ethylene, can be used.
9. The complete distillation procedure can be implemented by as few as a single operating person and with few and/or minimal maintenance procedures. One person can operate more than one device at the same time.

II.—Description

The distillation device presented in this application may include two independently manufactured modules. See FIGS. 1-6.

A.—The lower module (A) of the device may include the elements listed as follows:
1. Water boiler (A1)
2. Heat conducting disc (A2)
3. Steam heating chamber (A3)
4. Vessel for raw material or still (A4)
5. Steam flow ration valve (A5)
6. Elastic gasket (A6)
7. Fixing pins (A7)

B.—The upper module (B) of the device may include the elements listed as follows:
1. Condenser lid (B1)
2. Distillate collector ring (B2)
3. Distillate evacuation tube (B3)
4. Fixing duct (B4)
5. Wing nut (B5)

C.—The description of the elements of the lower module (A) of the device may be as follows:

A1.—The boiler (A1) of the device may include a first cylindrical vessel and a similar, smaller second vessel installed inside the first one in such a way that it stays suspended in the first one, creating a space between the vessels. Both vessels may be attached at their edges to a flat fastening ring of the same material, the external diameter of this ring may be slightly larger than the diameter of the larger vessel and may have small blocks welded to the interior surface to create a steam access slot that may fluidly connect the boiler (A1) and the steam heating chamber (A3).

A2.—The heat conducting disc (A2) may be a section of a round metallic bar that may be welded in the center of the boiler's (A1) double bottom. Said disc (A2) may conduct heat from the heating unit (e.g., stove) up to the bottom of the steam heating chamber (A3) through the double bottom of the boiler (A1). The disc (A2) may be in contact with both sides of the bottom of said boiler (A1) (e.g., upper side and lower side) for heating steam at the bottom of said chamber (A3) located just over the boiler (A1).

A3.—The steam heating chamber (A3) of the device may be formed with the addition of a third vessel, the prime matter still (A4) installed inside the boiler (A1). The facing surfaces of said boiler (A1) and said still (A4), having a space left between them, may make up the chamber (A3).

A4.—The prime matter vessel or still (A4) may be the third vessel mentioned above, and it may be installed in such a way that it is suspended inside and supported over the boiler (A1) by means of a ring gasket welded at the upper edge of this vessel (A4). The ring gasket may have the same external diameter of the ring that goes over the edge of the boiler (A1). At the center of the bottom of the still (A4) there may be a hole that fluidly connects the steam chamber (A3) with the still (A4) and facilitates the installation of an open valve (A5) to ration the steam flow and guide the steam into the still (A4).

A5.—The steam flow ration valve (A5) may include a metallic piece of three short, hexagonal blocks (E1, E2 and E3, respectively) all of them hollowed out on one of their sides and screwed together, one over the other. The first two blocks (E1 and E2) may be joined at the sides opposite of their hollowed sides and the third block (E3) may be joined with the second one (E2) at their hollowed sides. In the axis of the first and second blocks (E1 and E2) there may be a hole providing a fluidly connecting path for steam between the chamber (A3) and the cavity inside of the valve (A5) between the second and third blocks (E2 and E3). The lower block (E1) of the valve (A5) may be placed at the center of the bottom of the outside of the still (A4) with its hollowed side facing away from the bottom of the still (A4). The second block (E2) may be placed at the center of the bottom of the inside of the still (A4) with the hollowed side facing away from the bottom of the still (A4). The third block (E3) (or cap of the valve) may be slightly separated from the second block (E2) by small washers (E5) fluidly connecting the cavity inside of the valve (A5) to the still (A4) via a channel between the second and third blocks (E2 and E3). Each washer (E5) may surround one of three bolts (E6) that may affix the blocks (e.g., E2 and E3). The thickness of these washers may determine the steam flow that may be horizontally injected into the still (A4). The cap (E3) of the valve (A5) may have a screw (E7) inserted through its axis, and the screw (E7) may have a milimetric hole (E8) that may fluidly connect the cavity inside of the valve (A5) to the still (A4) and be configured to ration the steam flow that is injected vertically into the still (A4). Both the holes of the first (E1) and third block (E3) may be configured as small, Venturi type vacuum tubes.

A6.—An elastic gasket ring (A6) may be placed over the edge of the boiler (A1) and right under the fastener ring of the still (A4) and may hermetically close the junction between said boiler (A1) and the still (A4), preventing the losses of steam from the boiler (A1).

A7.—The fixing pins (A7), of which there may be three, may be equidistant one to the other and welded in a vertical position to the ring of the boiler (A1), and their function may be to firmly join the upper (B) and lower (A) modules of the device, such as by joining the lid (B1) and the boiler (A1).

Additional elements that may be included in the lower module (A) of the distiller:
1. Terminal fitting configured for water inlet to the boiler (A1).
2. Fittings configured for installation of a water level meter, such as a transparent tube, which may be made of glass.
3. Terminal fitting configured for thermometer installation.
4. Terminal fitting configured for steam pressure safety valve.
5. Terminal fitting configured for inlet/outlet conduit.

D.—The description of the elements of the upper module (B) of the device may be as follows:

B1.—The condenser lid (B1) of the distiller may include a half sphere shaped vessel and another vessel with a conic shape with a 45° or less angle (measured from the vertical line). Both vessels may have approximately the same height and diameter at a base, and they may be fixed to each other at both an apical end and at a bottom edge at the base. The half sphere vessel may be placed over the conic shape vessel, such that the conic shape vessel may be located under and inside of the half sphere vessel. The condenser lid (B1) may be placed over the still (A4) and may be configured as a cover of the device. A distiller manufactured with metallic vessels may have a condenser lid (B1) reinforced by means of a thicker or denser, metallic, round belt whose internal upper edge may be welded at the bottom edges of the condenser lid vessels and may serve as support for and to assemble the lid (B1). The cavity between the condenser lid vessels (half sphere and cone) may constitute the volume of a cold water chamber and the capacity of the cold water chamber may be determined by the volumetric difference between the condenser lid vessels. The internal side of the cone may be the condensation surface of the distiller and may make direct contact with the mixed gases that emanate from the still (A4). The angle of the internal side of the cone may allow for continuous flow of distillate to the collector ring (B2) by gravity force and adsorption.

B2.—The distillate collector ring (B2) may be an elastic element, like silicone, that may be placed between the still (A4) and the lid (B1) of the device. The distillate collector ring (B2) may acquire a conic shape that may be configured to collect the liquid distillate, flowing down from the condensation cone of the lid (B1), between the distillate collector ring (B2) and the lid (B1). The distillate collector ring (B2) may be configured as an hermetic sealing gasket between the lid (B1) and the still (A4) of the device, and configured to prevent leaking of distilled liquid down the sides of the lower module (A) of the device.

B3.—The distilled liquid may exit the device through an evacuation tube (B3) whose main axis may have an axial direction with a slight downward inclination. The evacuation tube (B3) may be located on and/or through the edge of the lid (B1).

B4.—The fixing ducts (B4) of the lid (B1), may include three cylindrical blocks with holes through their vertical axes and may be welded in a vertical position equidistant one to the other at the lower side of the lid (B1). The fixing ducts (B4) may be aligned with the fixing pins (A7) of the boiler (A1), which may be inserted into the fixing ducts (B4) when the lid (B1) is installed.

B5.—The wing nuts (B5) may be screwed onto the fixing pins (A7) of the boiler (A1) when the lid (B1) of the device is closed.

Additional elements which may be included in the upper module (B) of the device:
1. Fittings configured for attachment of inlet and outlet cold water conduits.
2. Fitting configured for installation of a thermometer that may be configured to monitor mixed gases temperature. The fitting may also be configured for attachment of a second condenser lid (B1) over the first lid (B1) for fractional distillation.

E.—Circuit and dynamics of steam, mixed gases and liquid distillate during an internal distillation process. See FIG. 2, flow diagram of internal distillation.

The steam route, shown in FIG. 2 with dotted lines and arrow heads, may start just over the evaporation surface at the upper level of the water in the boiler (A1). The steam may ascend by the interstitial sides of the boiler (A1) and descend to the bottom of the heating chamber (A3). The steam may enter the valve (A5) and move up through the still (A4) where the prime matter is located. The mixed gases (steam-oil) may rise through the upper surface of the prime matter and the mixed gases may contact the cold side of the condensation lid (B1) where the mixed gases may condense. The condensed mixed liquid, or distilled liquid, may flow by adsorption and gravity down to the collection ring (B2). The distilled liquid may be conducted by the collection ring (B2) to the tube (B3) and may be evacuated to the outside of the device. The upper level of the prime matter is indicated leaves and a jagged line. The steam access valve (A5) is illustrated encircled by a dotted line.

The following describes a method of internal distillation:
1. Steam may be produced from evaporating water that was placed in the boiler (A1) and was heated by a stove placed under the device.
2. The heat radiated by said stove may be conducted by the disc (A2) up to the base of the steam heating chamber (A3).
3. Steam may ascend along the interstitial sides of the boiler (A1) and then descend along the external side of the still (A4) down to the bottom of the steam heating chamber (A3).
4. Steam may be reheated through contact with the upper face of the bottom of the boiler (A1) and may expand, increasing pressure in the heating chamber (A3).
5. Pressurized steam may flow through the valve (A5) and may be projected into the prime matter still (A4).
6. Steam may ascend through the prime matter carrying the essential oil gases it contains.
7. The mixed gases of steam and essential oil may rise above the prime matter and stay suspended in the upper side of the still (A4).
8. Cold water may flow through the interior cavity of the double sided condenser lid (B1) of the device.
9. The mixed gases may make contact with the cone of the lid (B1) whose surface may be cold from contact with the cold water and the mixed gases may condense on the lid (B1).
10. Distilled liquid (product of the condensation of mixed gases) may flow down the surface of the cone of the lid (B1), by gravity and adsorption, to the collection ring (B2) where the distilled liquid may accumulate.
11. The accumulated distilled liquid may circulate (by gravity) along the collector ring (B2) to the evacuation tube (B3).
12. The distilled liquid may be evacuated from the interior of the device through the evacuation tube (B3) and may be conducted by a pipeline to a receiving flask.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A modular steam distillation device for the extraction of volatile substances contained in raw materials of organic or inorganic nature, comprising:
    an upper module having a double-walled condenser lid configured for circulating cold water inside of said lid;
    a lower module configured to be placed over a stove and including:
        three concentric cylindrical vessels arranged successively one inside the other comprising an external vessel, an intermediate vessel, and an internal vessel, the cylindrical vessels configured in such a way that the external vessel and the intermediate vessel form a boiler between the external vessel and the intermediate vessel, and the intermediate vessel and the internal vessel form a chamber configured for steam re-heating between the intermediate vessel and the internal vessel, wherein a solid heat conducting disc configured to conduct heat from said stove to a base of said chamber is disposed at a center of a bottom of the boiler, and the internal vessel forms a still configured for containing a solid raw material to distill; and
        an open valve with an internal profile in a form of a Venturi tube configured for dosing and directing of a steam flow from said chamber towards an inside of said still, wherein said valve is disposed at a center of a bottom of the still;
    a flat elastic ring configured for hermetic closure of both modules of the modular steam distillation device disposed between a lower edge of the lid and an upper edge of the still, wherein said flat elastic ring is further configured for internal collection of a liquid distillate; and
    an evacuation tube disposed at the lower edge of the lid and configured for evacuating the liquid distillate from the modular steam distillation device.

2. The modular steam distillation device of claim 1, further comprising a slot along an entire upper internal edge of the boiler configured for passing steam from the boiler to the chamber.

3. The modular steam distillation device of claim 1, wherein the valve is formed by three solid trunks each having a conically shaped surface at one end and that are screwed one on top of the other.

4. The modular steam distillation device of claim 1, further comprising an elastic gasket configured for hermetic closure of the boiler, wherein said gasket is disposed on an upper edge of the boiler and has a flat ring shape.

5. The modular steam distillation device of claim 1, wherein the lid includes an underside having a conical surface configured for internal condensation of mixed gases.

6. The modular steam distillation device of claim 1, wherein the lid has a threaded terminal fitting at an apex of the lid and is configured for installing a thermometer, and is further configured for attaching an additional condenser for fractional distillation.

7. The modular steam distillation device of claim 1, further comprising three bolt-type fasteners disposed equidistantly from one another on a side of the modular steam distillation device and configured to exert a force required for a hermetic closure of the boiler, the still and the lid.

8. The modular steam distillation device of claim 1, further comprising threaded terminal fittings configured for:
  installing hoses for feeding and evacuating water from the boiler and disposed on a lower portion and an upper portion of a side of said boiler;
  installing a water level meter of said boiler comprising a transparent glass tube configured for measuring a level of water of said boiler;
  installing a water thermometer; and
  installing a safety valve configured for evacuating excess steam pressure.

9. The modular steam distillation device of claim 1, wherein the lid has an outer side having threaded terminal fittings configured for installing cold water inlet and outlet hoses and installing a thermometer configured to measure a temperature of mixed gases.

10. A method of internal steam distillation for extraction of volatile oils present in organic matter carried out by means of a modular steam distillation device having a single body in which the method is performed, the single body comprising a lower module and an upper module, wherein the lower module comprises a boiler, a chamber, and a still and the upper module comprises a condenser lid, a collector ring and an evacuation tube, the method comprising:
  producing a vacuum effect in the boiler disposed in the modular steam distillation device by a valve with an internal profile in a form of a Venturi tube disposed in the modular steam distillation device;
  boiling water at a low temperature approximately between 60° C. and 85° C. in the boiler;
  conducting heat from a stove the chamber by means of a heat conducting disc disposed inside the boiler;
  generating dry steam in the boiler;
  heating the dry steam in said chamber to approximately between 110° C. and 115° C.;
  injecting the dry steam as a pressurized flow into the still through the valve, wherein the valve connects the chamber and the still;
  preheating the still and a raw material contained in the still;
  volatizing aromatic oils contained in the raw material in the still generating mixed gases;
  ascending the mixed gases from the still to the condenser lid;
  cooling an internal space of the condenser lid by means of cold water;
  condensing the mixed gases into distilled liquids by contacting the mixed gases with a cone of the condenser lid;
  draining the distilled liquids from the cone to the collector ring;
  collecting the distilled liquids on the collector ring;
  directing the distilled liquids to the evacuation tube; and
  evacuating the distilled liquids from the device through the evacuation tube.

11. A modular steam distillation device for the extraction of volatile substances contained in raw materials of organic or inorganic nature, comprising a lower module including:
  an external vessel;
  an intermediate vessel disposed within the external vessel;
  a boiler comprising an internal surface of the external vessel and an external surface of the intermediate vessel;
  an internal vessel disposed within the intermediate vessel;
  a chamber comprising an internal surface of the intermediate vessel and an external surface of the internal vessel; and
  a valve having an internal profile in a form of a Venturi tube configured for dosing and directing a steam flow from the chamber into the internal vessel, wherein the valve is disposed at a bottom of the internal vessel.

12. The modular steam distillation device of claim 11, wherein the lower module further comprises a disc disposed between a bottom of the external vessel and a bottom of the intermediate vessel, wherein the disc is configured to conduct heat from outside the lower module to the chamber.

13. The modular steam distillation device of claim 11, further comprising an upper module having a double-walled condenser lid configured for circulating cold water inside of the lid.

14. The modular steam distillation device of claim 13, further comprising a distillate collector ring disposed between a lower edge of the lid and an upper edge of the internal vessel, wherein the distillate collector ring is configured to collect a liquid distillate from an internal surface of the lid.

15. The modular steam distillation device of claim 14, wherein the upper module further comprises an evacuation tube configured to evacuate the liquid distillate collected by the distillate collector ring from the modular steam distillation device.

16. The modular steam distillation device of claim 14, wherein the distillate collector ring is configured as a hermetic sealing gasket.

17. The modular steam distillation device of claim 11, further comprising a slot formed between an a upper end of an external vessel surface of the boiler and an upper end of an intermediate vessel surface of the boiler, wherein the slot is configured to pass steam from the boiler to the chamber.

18. The modular steam distillation device of claim 11, wherein the internal vessel further comprises a ring gasket disposed at an upper end of the internal vessel.

19. The modular steam distillation device of claim 11, wherein the valve comprises a first part disposed in the internal vessel and a second part disposed in the chamber, wherein:
  the first part and the second part are fluidly connected via a connecting path through the bottom of the internal vessel;
  the first part comprises a hollowed upper internal surface and a hollowed lower internal surface; and
  the second part comprises a hollowed lower surface.

20. The steam distillation device of claim 19, wherein the first part further comprises:
  a first block having the hollowed upper internal surface;
  a second block having the hollowed lower internal surface; and
  a channel formed between a lower end of the first block and an upper end of the second block.

* * * * *